United States Patent
Hart et al.

(10) Patent No.: US 7,327,923 B2
(45) Date of Patent: Feb. 5, 2008

(54) SPIRAL MULTILAYER FIBERS

(75) Inventors: Shandon D. Hart, Maplewood, MN (US); Keith M. Kotchick, St. Paul, MN (US); William J. Kopecky, Hudson, WI (US); Patrick R. Fleming, Lake Elmo, MN (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/278,348

(22) Filed: Mar. 31, 2006

(65) Prior Publication Data

US 2007/0230883 A1    Oct. 4, 2007

(51) Int. Cl.
  *G02B 6/02*    (2006.01)
  *G02B 6/00*    (2006.01)
(52) U.S. Cl. .................... 385/126; 385/11; 385/124
(58) Field of Classification Search ................ 385/126, 385/11, 124
See application file for complete search history.

(56) References Cited

U.S. PATENT DOCUMENTS

| | | | |
|---|---|---|---|
| 3,164,563 A | 1/1965 | Maxwell et al. |
| 3,308,508 A | 3/1967 | Schrenk |
| 3,510,447 A | 5/1970 | Bourgnignon |
| 3,565,985 A | 2/1971 | Schrenk et al. |
| 3,576,707 A | 4/1971 | Schrenk et al. |
| 3,607,509 A | 9/1971 | Schrenk |
| 3,647,612 A | 3/1972 | Schrenk et al. |
| 3,746,485 A | 7/1973 | Schrenk |
| 3,759,647 A | 9/1973 | Schrenk et al. |
| 3,801,429 A | 4/1974 | Schrenk et al. |
| 4,344,906 A | 8/1982 | Kitagawa et al. |
| 5,039,566 A | 8/1991 | Skubic et al. |
| 5,175,030 A | 12/1992 | Lu et al. |
| 5,183,597 A | 2/1993 | Lu |
| 5,202,574 A | 4/1993 | Fu et al. |
| 5,380,479 A | 1/1995 | Schrenk et al. |
| 5,428,098 A | 6/1995 | Brekner et al. |

(Continued)

FOREIGN PATENT DOCUMENTS

EP    1 072 637    1/2001

(Continued)

OTHER PUBLICATIONS

Benoit, et al., "Static and Dynamic Properties of Optical Microcavities in Photonic Bandgap Yarns," *Advanced Materials*, vol. 15, No. 24, pp. 2053-2056 (Dec. 17, 2003).

(Continued)

*Primary Examiner*—K. Cyrus Kianni
(74) *Attorney, Agent, or Firm*—Jay R. Pralle

(57) ABSTRACT

A spiral wound fiber that includes birefringent interfaces is useful in different optical devices. One type of wound fiber includes at least first and second material layers. At least one of the layers is polymeric and at least one of the layers is birefringent. The spiral wound fiber may be used alone, or in an optical device. Such an optical device can include the fiber embedded within a matrix or attached to a substrate. The spiral wound fiber can be made by rolling a stack of at least two layers, by coextruding the two layers or by coating a rotating form.

16 Claims, 7 Drawing Sheets

U.S. PATENT DOCUMENTS

| | | |
|---|---|---|
| 5,665,450 A | 9/1997 | Day et al. |
| 5,751,388 A | 5/1998 | Larson |
| 5,793,456 A | 8/1998 | Broer et al. |
| 5,825,543 A | 10/1998 | Ouderkirk et al. |
| 5,828,488 A | 10/1998 | Ouderkirk et al. |
| 5,867,316 A | 2/1999 | Carlson et al. |
| 5,882,774 A | 3/1999 | Jonza et al. |
| 5,932,626 A | 8/1999 | Fong et al. |
| 6,322,236 B1 | 11/2001 | Campbell et al. |
| 6,844,950 B2 | 1/2005 | Ja Chisholm et al. |
| 6,846,089 B2 | 1/2005 | Stevenson et al. |
| 6,881,288 B2 | 4/2005 | Davies et al. |
| 6,930,820 B1* | 8/2005 | Shooks et al. ............... 359/325 |
| 7,167,622 B2* | 1/2007 | Temelkuran et al. ........ 385/123 |
| 7,231,122 B2* | 6/2007 | Weisberg et al. ............ 385/123 |
| 2002/0159019 A1 | 10/2002 | Pokorny et al. |
| 2003/0031846 A1 | 2/2003 | Kumazawa et al. |
| 2003/0031852 A1 | 2/2003 | Fink et al. |
| 2003/0118805 A1 | 6/2003 | Kretman et al. |
| 2004/0062934 A1 | 4/2004 | Miller et al. |
| 2004/0132867 A1 | 7/2004 | Shibahara et al. |
| 2004/0223715 A1 | 11/2004 | Benoit et al. |
| 2004/0228778 A1 | 11/2004 | Murari et al. |
| 2005/0053345 A1 | 3/2005 | Bayindir et al. |
| 2005/0129877 A1 | 6/2005 | Akada et al. |
| 2005/0169339 A1* | 8/2005 | Cumbo .......................... 372/66 |
| 2005/0201674 A1* | 9/2005 | Ellwood, Jr. .................. 385/17 |
| 2005/0201715 A1* | 9/2005 | Ellwood, Jr. ................ 385/147 |
| 2005/0226579 A1* | 10/2005 | Fink et al. ................... 385/126 |
| 2005/0259933 A1* | 11/2005 | Temelkuran et al. ........ 385/123 |
| 2005/0259934 A1* | 11/2005 | Temelkuran et al. ........ 385/125 |
| 2005/0259942 A1* | 11/2005 | Temelkuran et al. ........ 385/147 |
| 2005/0271340 A1* | 12/2005 | Weisberg et al. ............ 385/123 |
| 2006/0001358 A1 | 1/2006 | Onishi |
| 2006/0193577 A1 | 8/2006 | Ouderkirk et al. |
| 2006/0193578 A1 | 8/2006 | Ouderkirk et al. |
| 2006/0193593 A1 | 8/2006 | Ouderkirk et al. |
| 2006/0194046 A1 | 8/2006 | Ouderkirk et al. |
| 2006/0194487 A1 | 8/2006 | Ouderkirk et al. |
| 2006/0257678 A1 | 11/2006 | Benson, Jr. et al. |
| 2007/0031097 A1* | 2/2007 | Heikenfeld et al. ......... 385/129 |
| 2007/0122096 A1* | 5/2007 | Temelkuran et al. ........ 385/126 |

FOREIGN PATENT DOCUMENTS

| | | |
|---|---|---|
| EP | 1 477 529 | 11/2004 |
| GB | 1 126 774 | 9/1968 |
| JP | 54-078787 | 6/1979 |
| JP | 05-070627 | 3/1993 |
| JP | 10-036655 | 2/1998 |
| JP | 2004-051960 | 2/2004 |
| JP | 2004-114617 | 4/2004 |
| JP | 03-544264 | 7/2004 |
| JP | 2004-277657 | 10/2004 |
| JP | 2004-315544 | 11/2004 |
| JP | 2005-326492 | 11/2005 |
| WO | WO 96/30203 | 10/1996 |
| WO | WO 02/31053 | 4/2002 |
| WO | WO 02/062877 | 8/2002 |
| WO | WO 2004/077935 | 9/2004 |

OTHER PUBLICATIONS

Hart, et al., "External Reflection from Omnidirectional Dielectric Mirror Fibers," *Science*, vol. 296, pp. 510-513 (Apr. 19, 2002).

Kim et al., "Analysis of thermo-physical and optical properties of a diffuser using PET/PC/PBT copolymer in LCD backlight units," *Science Direct—Displays* 26, pp. 37-43 (2005).

Kim, GeunHyung, "A PMMA composite as an optical diffuse in a liquid crystal display backlighting unit," *Science Direct, European Polymer Journal*, vol. 41, pp. 1729-1737 (2005).

Kuriki, et al., "Hollow multilayer photonic bandgap fibers for NIR applications," *Optics Express*, vol. 12, No. 8, pp. 1510-1517 (Apr. 2004).

Temelkuran et al., "Wavelength-scalable hollow optical fibres with large photonic bandgaps for $CO_2$ laser transmission," *Nature*, no date.

U.S. Appl. No. 11/278,258, "Structured Composite Optical Films", filed on even date herewith and having, no date.

U.S. Appl. No. 11/278,346, "Reinforced Optical Films", filed on even date herewith and having, no date.

U.S. Appl. No. 11/278,336, "Structured Composite Optical Films", filed on even date herewith and having, no date.

U.S. Appl. No. 11/278,358, "Spiral Multilayer Fibers", filed on even date herewith and having, no date.

U.S. Appl. No. 11/323,726, "Reinforced Reflective Polarizer Films", filed on even date herewith and having, no date.

* cited by examiner

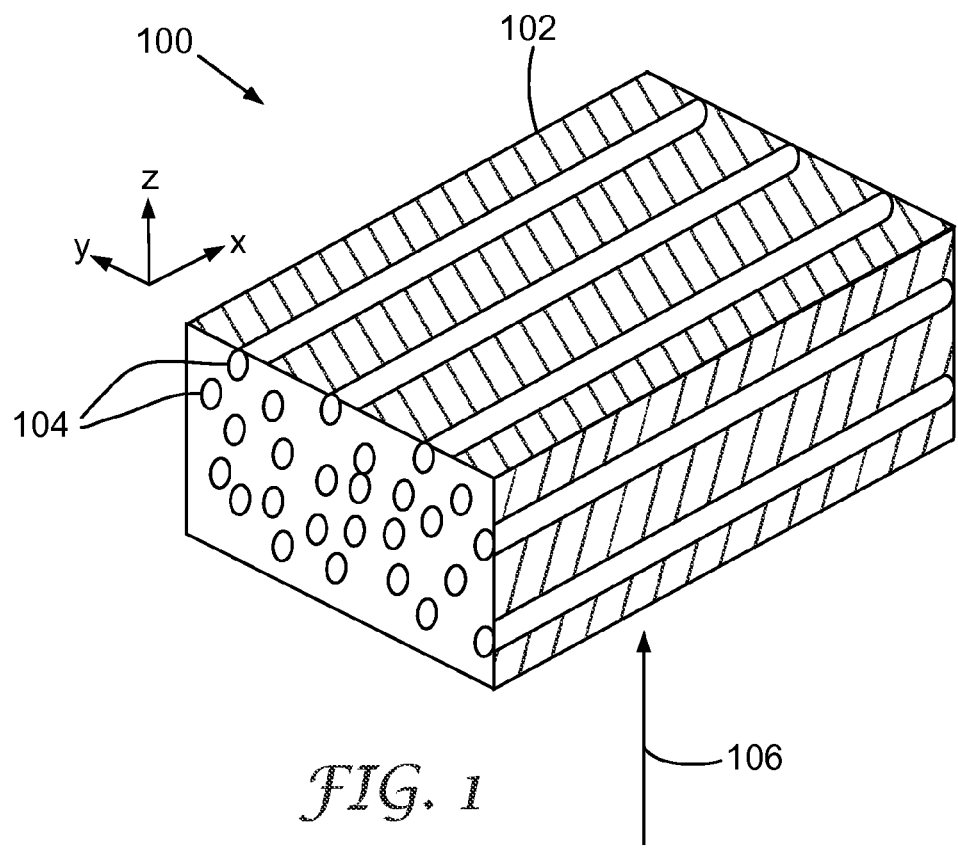
FIG. 1
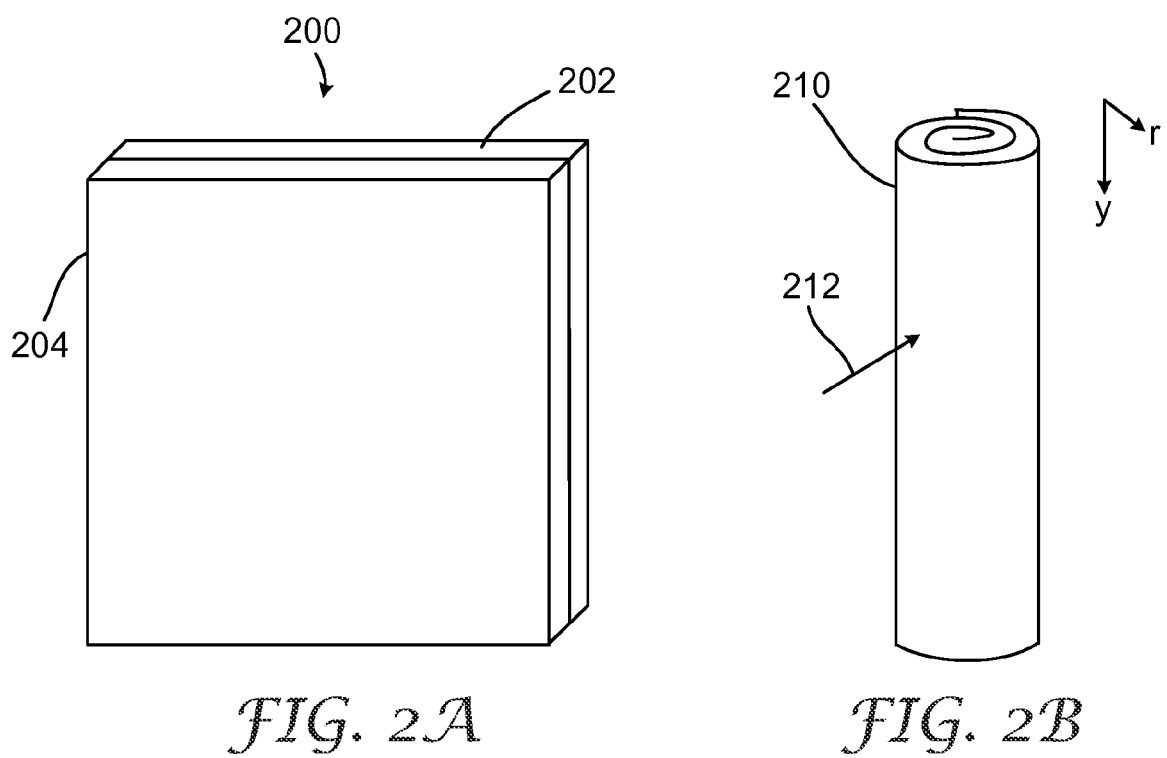
FIG. 2A
FIG. 2B

SPIRAL MULTILAYER FIBERS

FIELD OF THE INVENTION

The present invention relates to optical devices and more specifically to optical devices that include fibers.

BACKGROUND

Several useful optical systems can be implemented using polarized light. For example, electro-optical devices such as liquid crystal display screens, are illuminated with polarized light and use a pair of polarizers in conjunction with an addressable liquid crystal interlayer to provide the basis for displaying image formation. In the field of photography, polarizing filters have been used to reduce the glare and the brightness of specular reflection. Polarizing filters, circular polarizers or other optical components have also been used for glare reduction in display device screens.

Several different kinds of polarizing film are available for polarizing unpolarized light. Absorbing (dichroic) polarizers have, as an inclusion phase, polarization-dependent absorbing species, often an iodine-containing chain, that are aligned within a polymer matrix. Multilayer reflective polarizers contain a film formed of a stack of many layers of alternating polymer materials. One of the materials is optically isotropic while the other is birefringent, with one of its refractive indices matched to that of the isotropic material. Light of one polarization state is reflected at the interfaces between the layers while light in the other polarization state is transmitted through the polarizer. A diffusely reflecting polarizer can be constructed from inclusions dispersed within a continuous phase matrix. The inclusions are small relative to the width and height of the film. The characteristics of these inclusions can be manipulated to provide a range of reflective and transmissive properties to the film. Either the continuous phase or the disperse phase is birefringent, with one of the refractive indices of the birefringent material matching to the refractive index of the other phase, which is optically isotropic.

Another type of reflective polarizing film is constructed from polymeric fibers within a polymeric matrix, where the polymeric fibers contain interfaces between two materials, one of which is birefringent. Index matching between an isotropic material and one of the two birefringent refractive indices results in one polarization state being transmitted while the other polarization state is diffusely reflected.

One type of polymeric fiber considered for such a polarizer is a concentric multilayer (CML) fiber, which has a series of concentric polymeric layers of alternating materials. This type of fiber is manufactured by coextruding the structure using a complex die and tightly controlled process conditions. Also, the materials used in this type of fiber are limited to those suited for extrusion.

SUMMARY OF THE INVENTION

The present invention is a different type of multilayer fiber that can be extruded using a simpler process, or can be manufactured without extrusion. This approach yields greater flexibility in the types of materials that can be used in the fiber and provides the potential for better control of the refractive indices of the various layers in the finished product.

One embodiment of the invention is directed to a polymer fiber that has a first material layer and a second material layer spiral wound together. The first material layer is formed of a birefringent material having a first ordinary refractive index, $n_{1a}$, and a first extraordinary refractive index, $n_{1b}$. The second material layer has at least a first refractive index different from one of the first ordinary refractive index and the first extraordinary refractive index so as to form a birefringent interface with the first material layer. At least one of the first and second material layers is polymeric.

Another embodiment of the invention is directed to an optical body having a polymer matrix formed of a matrix material, with a plurality of fibers disposed within the polymer matrix. The plurality of fibers includes at least a first fiber comprising a first material layer and a second material layer spiral wound together. The first material layer has at least a first refractive index, $n_1$, and the second material layer has at least a second refractive index, $n_2$ that is substantially different from $n_1$. At least one of the first and second layers is formed of a polymer.

Another embodiment of the invention is directed to an optical element that has a substrate and an arrangement of fibers disposed on the substrate. At least one of the fibers includes a first fiber having a first material layer and a second material layer spiral wound together. The first material layer has at least a first refractive index, $n_1$, and the second material layer has at least a second refractive index, $n_2$, that is substantially different from $n_1$. At least one of the first and second material layers is a polymer layer. In some embodiments, the optical element is included in a display system, between a backlight and a display unit.

Another embodiment of the invention is directed to a method of forming a spiral wound polymer fiber. The method includes providing at least a first layer of polymer material and a second layer of material, the first and second layers forming a stack of layers. The stack is wound to form a spiral wound body. Polymer molecules in at least the first polymer layer are oriented so as to make the first polymer layer birefringent.

Another embodiment of the invention is directed to a method of forming a spiral wound polymer fiber. The method includes coextruding a spiral wound polymer body comprising at least first and second polymer layers in an interlayered spiral wound arrangement. Polymer molecules in at least the first polymer layer are oriented so as to make the first polymer layer birefringent.

Another embodiment of the invention is directed to a method of forming a spiral wound polymer fiber. The method includes rotating an elongated form about a longitudinal axis and displacing the elongated form in a direction substantially parallel to the axis. A first polymer layer is coated at a first coating position onto the elongated form while the elongated form is rotated and displaced. A second layer is coated at a second coating position on top of the first polymer layer while the elongated form is rotated and displaced. Polymer molecules in at least the first polymer layer are oriented so as to make the first polymer layer birefringent.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 schematically illustrates an optical body containing polymer fibers;

FIGS. 2A and 2B schematically illustrate one approach to manufacturing a spiral wound fiber, according to principles of the present invention;

Figure 3A:
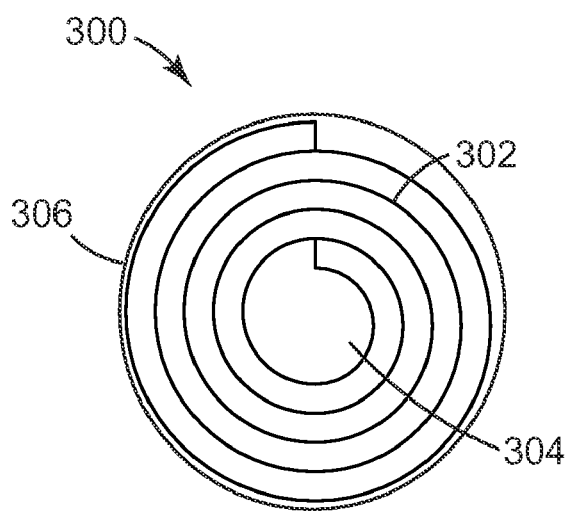
FIGS. 3A-3D schematically illustrate exemplary embodiments of spiral wound fibers having different cross-sections, according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

This disclosure relates to alternative geometries for functional optical fibers. Specifically, the disclosure discusses fiber designs that produce similar optical effects to those resulting from a Concentric Multilayer (CML) polymeric fiber, but are simpler to manufacture than CML fibers and provide for improved control over the refractive indices of the finished product. While it is believed that the fibers described herein have significant utility in applications requiring transverse illumination, i.e. illumination in a direction perpendicular to the longitudinal axis of the fiber, longitudinal light transfer within the fibers is also possible. The use of birefringent polymer fibers in polarizers and other optical devices is described further in a number of patent applications U.S. patent applications Ser. Nos. 11/068,157, and 11/068,590, both filed on Feb. 28, 2005, and both of which are incorporated by reference. The fibers discussed herein may find use in the various applications described in these references.

Birefringent spiral wound polymeric fibers of the type discussed herein may find application as polarizing fibers, mirror fibers, or other light management fibers, especially where multiple interfaces between two materials, having different birefringent refractive indices, are desired. In some applications, the spiral-wound birefringent fibers are encapsulated in a resin matrix. The resin matrix may be birefringent or isotropic and can be made of one of the materials used in the spiral-wound fiber or can be made from a different material. The resin matrix may have the same refractive index as one of the indices of the materials in the polymer fiber, or a different refractive index. The scattering characteristics of the encapsulated fibers (scattering strength, color, etc.) may be adjusted through tailoring the refractive index characteristics of the encapsulating resin or through tailoring the fiber design.

While a spiral wound birefringent fiber shares some optical functionality with a CML fiber, it has a different structure, and different embodiments employ induced material birefringence to create or enhance the desired optical functionality. Since the structure is different from CML fibers, different methods may be employed in manufacturing the spiral wound fiber, providing greater flexibility in the types of materials that can be used and in the optical properties of the fiber.

A schematic of an optical body 100 that contains fibers is presented in FIG. 1. The optical body 100 comprises a polymer matrix 102, also referred to as a continuous phase. The polymer matrix may be optically isotropic or optically birefringent. For example, the polymer matrix may be uniaxially or biaxially birefringent, meaning that the refractive index of the polymer may be different along one direction and similar in two orthogonal directions (uniaxial) or different in all three orthogonal directions (biaxial).

The optical body 100 also includes one or more spiral wound fibers 104 disposed within the polymer matrix 102. The spiral wound fibers contain layers of at least two different materials, at least one of which is polymeric. The refractive indices in the x-, y-, and z-directions for the first fiber material may be referred to as $n_{1x}$, $n_{1y}$, and $n_{1z}$, and the refractive indices in the x-, y-, and z-directions for the second fiber material may be referred to as $n_{2x}$, $n_{2y}$, and $n_{2z}$. Where the material is isotropic, the x-, y-, and z-refractive indices are all substantially matched. Where the first fiber material is birefringent, at least one of the x-, y- and z-refractive indices is different from the others.

There are multiple interfaces within each fiber 104 between the first fiber material and the second fiber material. Where at least one of the materials forming the interface is birefringent, the interface is referred to as a birefringent interface. For example, if the two materials present their x-and y-refractive indices at the interface, and $n_{1x} \neq n_{1y}$, i.e. the first material is birefringent, then the interface is birefringent. Different exemplary embodiments of the polymer fibers containing birefringent interfaces are discussed below.

The fibers 104 may be organized within the matrix 102 as single fibers, as illustrated, or in many other arrangements. Some exemplary arrangements include yarns, a tow (of fibers or yarns) arranged in one direction within the polymer matrix, a weave, a non-woven, chopped fiber, a chopped fiber mat (with random or ordered arrangements), or combinations of these arrangements. The chopped fiber mat or nonwoven may be stretched, stressed, or oriented to provide some alignment of the fibers within the nonwoven or chopped fiber mat, rather than having a random arrangement of fibers.

The fibers 104 may be disposed generally parallel to an axis, illustrated as the x-axis in FIG. 1. The refractive index difference at the birefringent interfaces within the fibers 104 for light polarized parallel to the x-axis, $n_{1x}-n_{2x}$, may be different from the refractive index difference for light polarized parallel to the y-axis, $n_{1y}-n_{2y}$. Thus, for one polarization state, the refractive index difference at the birefringent interfaces in the fibers 104 may be relatively small. In some exemplary cases, the refractive index difference may be less than 0.05. This condition is considered to be substantially index-matched. This refractive index difference may be less than 0.03, less than 0.02, or less than 0.01. If this polarization direction is parallel to the x-axis, then x-polarized light passes through the fiber 104 with little or no reflection. In other words, x-polarized light is highly transmitted through the fibers 104, with the result that the body 100 transmits x-polarized light. In some cases, a certain amount of index mismatching can intentionally be provided to create partial reflection and/or scattering.

The refractive index difference at the birefringent interfaces in the fibers may be relatively high for light in the orthogonal polarization state. In some exemplary examples, the refractive index difference may be at least 0.05, and may be greater, for example 0.1, or 0.15 or may be 0.2. If this polarization direction is parallel to the y-axis, then y-polarized light is reflected at the birefringent interfaces. Thus, y-polarized light is reflected by the fibers 104. The direction of the reflected light depends on the orientation of the birefringent interfaces. Where the birefringent interfaces are not substantially parallel to each other, then the reflection may be substantially diffuse. In the case of a spiral wound fiber, the birefringent interfaces may be curved, which provides for reflection of light over a wide range of angles.

While the exemplary embodiment just described is directed to index matching in the x-direction, with a relatively large index difference in the y-direction, other embodiments include index matching in the y-direction, with a relatively large index difference in the x-direction.

The directional refractive indices for the polymer matrix 102 are referred to as $n_{3x}$, $n_{3y}$ and $n_{3z}$ for light polarized parallel to the x, y and z directions respectively. The polymer matrix 102 may be substantially optically isotropic, for example having a birefringence, $n_{3x}-n_{3y}$, of less than about 0.05, and preferably less than 0.01. In other embodiments, the polymer matrix 102 may be birefringent. Consequently, in some embodiments, the refractive index difference between the polymer matrix and the fiber materials may be different in different directions. For example, the x-refractive index difference, $n_{1x}-n_{3x}$, may be different from the y-refractive index difference, $n_{1y}-n_{3y}$. In some embodiments, one of these refractive index differences may be at least twice as large as the other refractive index difference.

In some embodiments, the refractive index difference, the extent and shape of the birefringent interfaces, and the relative positions of the birefringent interfaces may result in diffuse scattering of one of the incident polarizations more than the other polarization. Such scattering may be primarily back-scattering (diffuse reflection) forward-scattering (diffuse transmission) or a combination of both back- and forward-scattering.

Suitable materials for use in the polymer matrix and/or in the fibers include thermoplastic and thermosetting polymers that are transparent over the desired range of light wavelengths. In some embodiments, it may be particularly useful that the polymers be non-soluble in water. Further, suitable polymer materials may be amorphous or semi-crystalline, and may include homopolymer, copolymer or blends thereof. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly(methylmethacrylate) (PMMA) and PMMA copolymers; ethoxylated and propoxylated (meth)acrylates; multi-functional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly(dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly(alkane napthalates), such as poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends. The term (meth)acrylate is defined as being either the corresponding methacrylate or acrylate compounds. These polymers may be used in an optically isotropic form.

Several of these polymers may become birefringent when oriented. In particular, PET, PEN, and copolymers thereof, and liquid crystal polymers, manifest relatively large values of birefringence when oriented. Polymers may be oriented using different methods, including extrusion and stretching. Stretching is a particularly useful method for orienting a polymer, because it permits a high degree of orientation and may be controlled by a number of easily controllable external parameters, such as temperature and stretch ratio. The refractive indices for a number of exemplary polymers, oriented and unoriented, are provided in Table 1 below.

TABLE I

Typical Refractive Index Values for Some Polymer Materials

| Resin/Blend | S.R. | T (° C.) | $n_x$ | $n_y$ | $n_z$ |
| --- | --- | --- | --- | --- | --- |
| PEN | 1 | — | 1.64 | | |
| PEN | 6 | 150 | 1.88 | 1.57 | 1.57 |
| PET | 1 | — | 1.57 | | |
| PET | 6 | 100 | 1.69 | 1.54 | 1.54 |
| CoPEN | 1 | — | 1.57 | | |
| CoPEN | 6 | 135 | 1.82 | 1.56 | 1.56 |
| PMMA | 1 | — | 1.49 | | |
| PC, CoPET blend | 1 | — | 1.56 | | |
| THV | 1 | — | 1.34 | | |
| PETG | 1 | — | 1.56 | | |
| SAN | 1 | — | 1.56 | | |
| PCTG | 1 | — | 1.55 | | |
| PS, PMMA copolymer | 1 | — | 1.55-1.58 | | |
| PP | 1 | — | 1.52 | | |
| Syndiotactic PS | 6 | 130 | 1.57 | 1.61 | 1.61 |

PCTG and PETG (a glycol-modified polyethylene terephthalate) are types of copolyesters available from, for example, Eastman Chemical Co., Kingsport, Tenn., under the Eastar™ brand name. THV is a polymer of tetrafluoroethylene, hexafluoropropylene and vinylidene fluoride, available from 3M Company, St. Paul, Minn., under the brand name Dyneon™. The PS/PMMA copolymer is an example of a copolymer whose refractive index may be "tuned" by changing the ratio of the constituent monomers in the copolymer to achieve a desired value of refractive index. The column labeled "S.R." contains the stretch ratio. A stretch ratio of 1 means that the material is unstretched and unoriented. A stretch ratio of 6 means that sample was stretched to six times it original length. If stretched under the correct temperature conditions, the polymeric molecules are oriented and the material becomes birefringent. It is possible, however, to stretch the material without orienting the molecules. The column labeled "T" indicates the temperature at which the sample was stretched. The stretched samples were stretched as sheets. The columns labeled $n_x$, $n_y$ and $n_z$ refer to the refractive indices of the material. Where no value is listed in the table for $n_y$ and $n_z$, the values of $n_y$ and $n_z$ are the same as for $n_x$.

The behavior of the refractive index under stretching a fiber is expected to give results similar to, but not necessarily the same as, those for stretching a sheet. Polymer fibers may be stretched to any desired value that produces desired values of refractive index. For example, some polymer fibers may be stretched to produce a stretch ratio of at least 3, and maybe at least 6. In some embodiments, polymer fibers may be stretched even more, for example to a stretch ratio of up to 20, or even more.

A suitable temperature for stretching to achieve birefringence is, in many case, approximately 80% of the polymer melting point expressed in Kelvins. Birefringence may also be induced by stresses induced by flow of the polymer melt experienced during extrusion and film formation processes. Birefringence may also be developed by alignment with adjacent surfaces such as fibers in the film article. Birefringence may either be positive or negative. Positive birefringence is defined as when the direction of the electric field axis for linearly polarized light experiences the highest refractive index when it is parallel to the polymer's orientation or aligning surface. Negative birefringence is defined as when the direction of the electric field axis for linearly polarized light experiences the lowest refractive index when it is parallel to the polymer's orientation or aligning surface. Examples of positively birefringent polymers include PEN and PET. Syndiotactic polystyrene is an example of a negatively birefringent polymer.

The matrix 102 and/or the fibers 104 may be provided with various additives to provide desired properties to the optical body 100. For example, the additives may include one or more of the following: an anti-weathering agent, UV absorbers, a hindered amine light stabilizer, an antioxidant, a dispersant, a lubricant, an anti-static agent, a pigment or dye, a nucleating agent, a flame retardant and a blowing agent. Other additives may be provided for altering the refractive index of the polymer or increasing the strength of the material. Such additives may include, for example, organic additives such as polymeric beads or particles and polymeric nanoparticles, or inorganic additives, such as glass, ceramic or metal-oxide nanoparticles, or milled, powered, bead, flake or particulate glass, ceramic or glass-ceramic. The surface of these additives may be provided with a binding agent for binding to the polymer. For example, a silane coupling agent may be used with a glass additive to bind the glass additive to the polymer.

In some embodiments, it may be desired that the matrix 102 or a component of the polymer fibers 104 be non-soluble, or at least resistant to solvents. Examples of suitable materials that are solvent resistant include polypropylene, PET and PEN. In other embodiments it may be preferable that the matrix 102 or component of the polymer fibers 104 is soluble in an organic solvent. For example, a matrix or fiber component formed of polystyrene is soluble in an organic solvent such as acetone. In other embodiments, it may be preferable that the matrix is water soluble. For example, a matrix or fiber component formed of polyvinyl acetate is soluble in water.

The refractive index of the materials in some embodiments of optical elements may vary along the length of the fiber, in the x-direction. For example, the optical element may not be subject to uniform stretching, but may be stretched to a greater degree in some regions than in others. Consequently, the degree of orientation of the orientable materials may not be uniform along the element, and so the birefringence varies spatially along the element.

The polymer fibers 104 may be straight, but need not be straight, for example the polymer fibers 104 may be kinked, spiraled or crimped.

One approach to understanding the structure of a spiral wound fiber is now discussed with reference to FIGS. 2A and 2B. A more detailed discussion on manufacturing spiral wound fibers is provided below. In a simple exemplary embodiment, a film stack 200, shown in FIG. 2A, contains a first layer 202 of polymeric material and a second layer of polymeric material 204. In this example, the first layer of polymeric material 202 is birefringent while the second layer of polymeric material 204 is isotropic, with its refractive index matching one of the indices of the birefringent first layer 202. The stack 200 can contain any number of layers, with a minimum of two layers. The optical thicknesses of the layers 202 and 204 in the stack may be selected to be approximately one quarter wavelength of a selected wavelength, or to have thicknesses within a desired range so as to increase the efficacy of reflection light of a particular polarization state and in a particular wavelength range. The layers 202 and 204 need not have uniform thickness.

In this figure, the layers 202 and 204 have a thickness in the z-direction and are planar in the x-y plane. Thus, the in-plane refractive indices for the birefringent layer 202 are $n_{1x}$ and $n_{1y}$, while the out of plane refractive index is $n_{1z}$. The in-plane refractive index for the isotropic layer is $n_2$ which, for this illustrative example is equal to $n_{1y}$. One of the in-plane refractive indices may be considered to be an ordinary refractive index while the other is an extraordinary refractive index.

FIG. 2B shows the rolled stack 210 produced by rolling the stack 200 up, around an axis parallel to the y-axis. The form of the rolled stack 210 is like a "jelly roll", with the two layers 202, 204 spiraling outwards from the center. Consider light 212 transversely incident on the rolled stack 210. If the light 212 is polarized parallel to the y-axis, i.e. is axially polarized, the light 212 will experience a refractive index of $n_{1y}$ in the first layer 202 and $n_2$ in the second layer. If these two refractive indices are substantially matched, the light 212 will be mostly transmitted through the rolled stack 200.

If, on the other hand, the light 212 is polarized perpendicular to the y-axis the light will experience a refractive index that is dependent on several factors, such as the angle of entry through the birefringent interface, how far off the stack's axis the light strikes the stack 200 and the values of $n_{1x}$ and $n_{1z}$. If, however, $n_{1x}$ is substantially equal to $n_{1z}$, the light polarized perpendicular to the y-axis will experience only a refractive index of $n_{1x}$, irrespective of the angle of incidence on the birefringent interface and how far off the stack's axis the light strikes the stack 200. Accordingly it may, in some embodiments, be advantageous for the out-of-plane refractive index of the birefringent layer to be substantially the same as one of the in-plane refractive indices.

FIGS. 3A-3D show various exemplary cross-sectional configurations of a spiral wound fiber. In FIG. 3A, the spiral wound fiber 300 is formed of a spiral wound stack 302. There is a hollow core 304 at the center of the fiber 300. The fiber 300, and the following embodiments of spiral wound fiber, may be provided with a cover 306 surrounding the spiral wound stack 302.

Figure 3B:
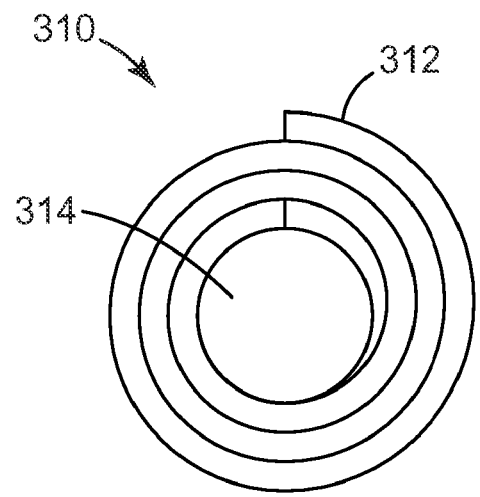

In FIG. 3B, the fiber 310 is formed with a spiral wound stack 312 wound around a circular solid core 314. The solid core 314 may be formed of any suitable optical material. For example, the solid core may be a polymer material or an inorganic material, such as glass, ceramic or glass-ceramic.

Figure 3C:
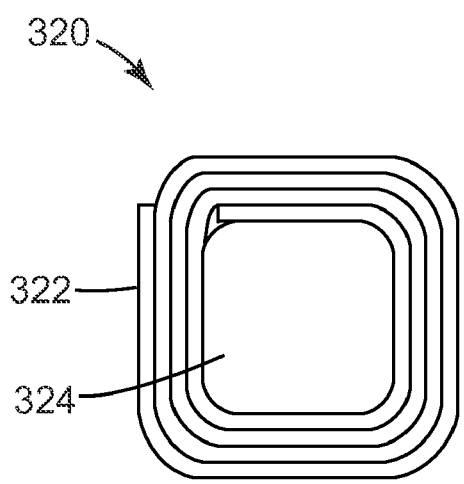

The spiral wound fiber need not be circular, or approximately circular, in cross-section. For example, the spiral wound fiber 320 shown in FIG. 3C is formed from a spiral wound stack 322 wound around a core 324. In this embodiment the core 324 is not circular in cross-section, but is square, with rounded corners, with the result that the fiber 320 is not circular. It will be appreciated that cores having other shapes may be used.

Figure 3D:
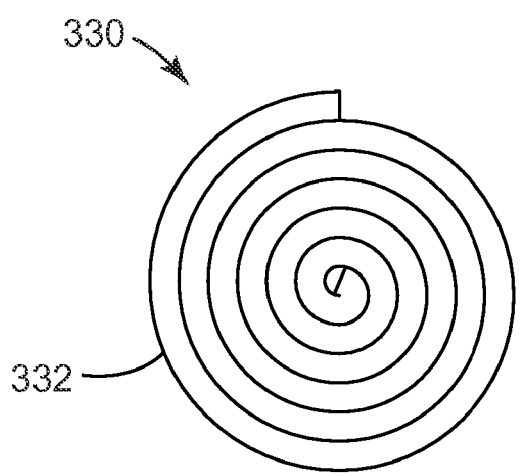

In another embodiment, shown in FIG. 3D, the fiber 330 is formed of a spiral wound stack 332 that starts in the center of the fiber 330, so that there is essentially no empty space at the center.

Figure 4A:
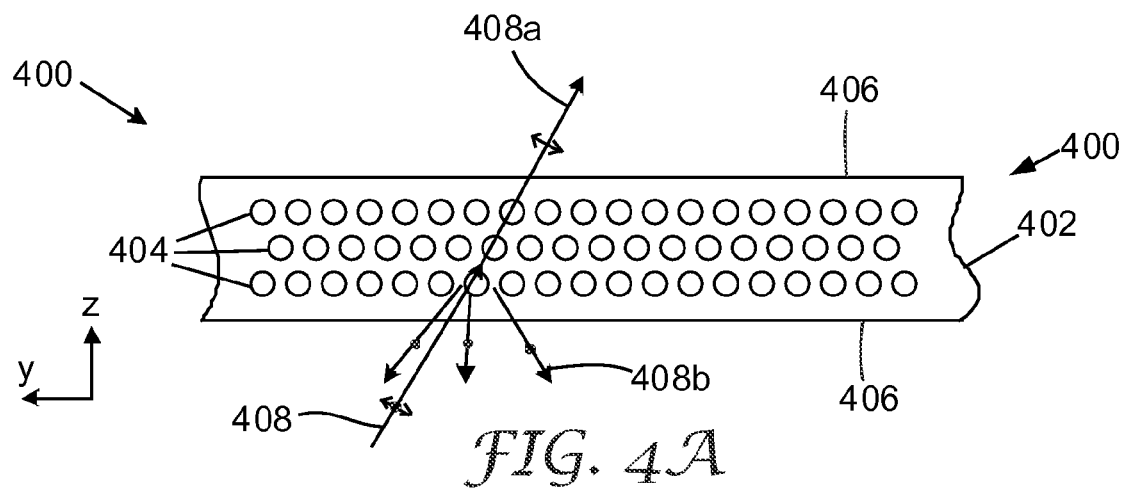
FIGS. 4A-4C schematically illustrate different embodiments of optical devices that incorporate spiral wound fibers embedded within a matrix, according to principles of the present invention.

Various types of optical elements can be made containing a spiral bound optical fiber. In one embodiment of an optical body 400, schematically illustrated in FIG. 4A, the matrix 402 surrounding the spiral wound fibers 404 has flat faces 406. Such an optical body 400 may be used, for example, as a reflective polarizer. In such a case, unpolarized light 408 incident at the body 400 is split into two polarized components. The first component 408a is substantially transmitted through the body 400. The second component 408b, which is orthogonally polarized to the first component 408a, may be substantially reflected by the body. Typically, the light is diffusely reflected.

It will be appreciated that whether light is specularly transmitted or diffusely transmitted, or is diffusely reflected, is dependent on several parameters, including the size of the fibers, the density of fibers, the cross-sectional shape of the fibers, and the refractive index differences at the birefringent interfaces within the fibers for the two polarization states. The specific operational characteristic of a particular device will be dependent on the choice of these and other parameters. For example, in some embodiments, light in one polarization state may be substantially specularly transmitted while light in the orthogonal polarization state is substantially diffusely reflected and/or transmitted.

The arrangement of the fibers 404 within the matrix may be different from that shown. For example, the fibers need not be arranged uniformly, but may be arranged with a greater density in some regions than others. Some other arrangements are discussed in greater detail in U.S. patent application Ser. Nos. 11/068,157, and 11/068,590.

Figure 4B:
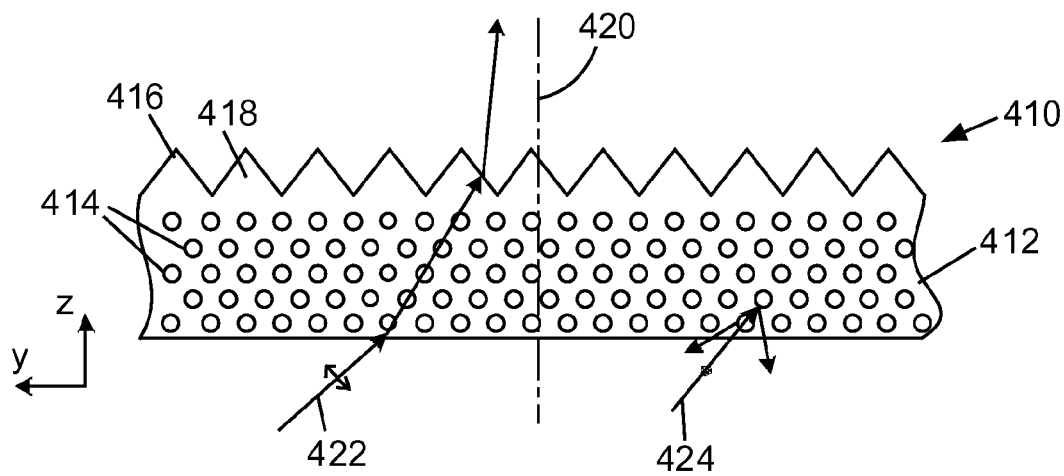

In other embodiments, the surface of the body may be provided with some optical function. For example, in the embodiment schematically illustrated in FIG. 4B, the body 410 has fibers 414 disposed within a matrix 412. The upper surface 416 of the body 410 is a brightness enhancing surface, i.e. the surface 416 is provided with protrusions 418 that direct off-axis light into a direction that is more parallel to the optical axis 420 of the body 410. In some embodiments, the protrusions form prismatic ribs on the surface of the body, although other shapes and configurations of brightness enhancing surface may also be used.

Thus, the body 410 provides both polarizing and brightness enhancing functions. For example, light 422, polarized in a direction that is transmitted through the fibers 414, is transmitted through the body 410 to the surface 416, where it is refracted so as to be more closely parallel to the axis 420. On the other hand, light 424 that is polarized in the orthogonal direction is reflected by the fibers 414.

Figure 4C:
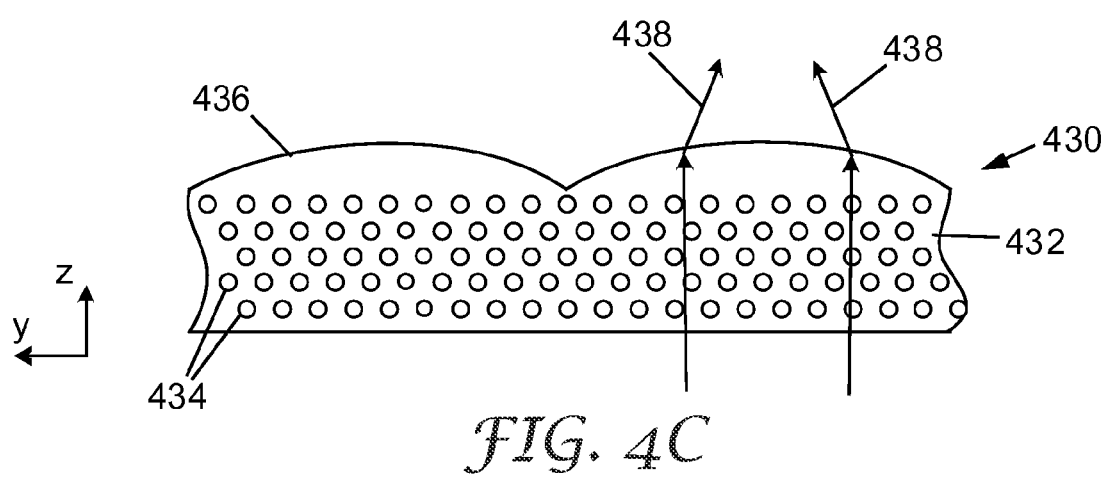

In another embodiment, schematically illustrated in FIG. 4C, the body 430 formed with fibers 434 embedded within a matrix 432, has a surface 436 that provides optical power to light 438 that passes through the body 430. In the illustrated embodiment, the surface 436 includes an array of lenslets on the surface 436, although other configurations may also be used. For example, the surface 436 may be configured as a Fresnel lens or as a diffracting surface.

Suitable approaches for manufacturing optical bodies that include polymeric fibers in a polymer matrix are discussed in greater detail in U.S. patent application Ser. No. 11/068,157. The spiral wound fibers may be configured within the matrix as individual fibers, one or more tows, one or more weaves, as chopped fiber, fused fibers, a fiber mat or a non-woven. Furthermore, the spiral wound fibers may be provided as yarn, twisted with one or more other fibers.

Figure 5A:
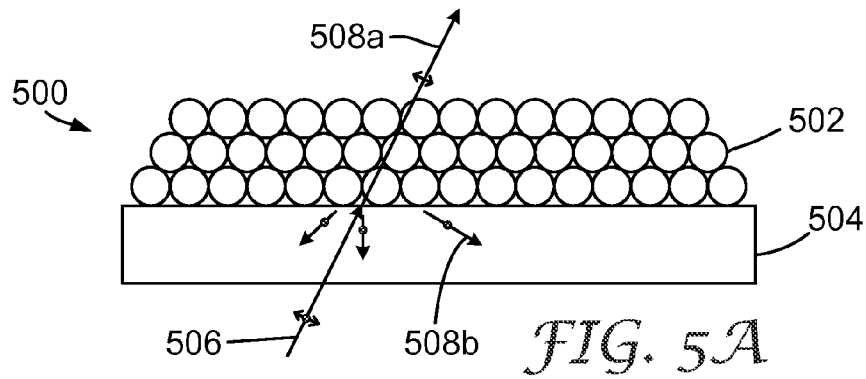
FIGS. 5A-5D schematically illustrate different embodiments of optical devices that incorporate spiral wound fibers mounted on a substrate, according to principles of the present invention.

Another type of optical device 500 that uses fibers having internal birefringent interfaces is schematically illustrated in FIG. 5A. In this device 500, a number of fibers 502, such as spiral wound fibers, are bonded together and are attached to a substrate 504. The fibers 502 may be bonded using any suitable method, such as an adhesive or by applying heat and/or pressure. In this embodiment, the substrate 504 is transparent, so that unpolarized light 506 incident on the substrate 504 is transmitted to the fibers 502. Light 508a in one polarization state is transmitted through the fibers 502 while light 508b in the orthogonal polarization state is diffusely reflected by the fibers 502.

As was discussed above for a device having fibers embedded within a matrix, the specific optical characteristics of the device are dependent on several parameters, including the size of the fibers, the density of fibers, the cross-sectional shape of the fibers, and the refractive index differences seen at the birefringent interfaces within the fibers for the two polarization states. The specific operational characteristic of a particular device will be dependent on the choice of these and other parameters. For example, in some embodiments, the light 508b may be diffusely transmitted and/or reflected.

The substrate may be any suitable type of substrate, for example formed of a polymer material or an inorganic material. In addition, the substrate may be simply transmissive across the spectrum of light used with the device, or may provide some optical functionality. For example, the substrate may have a functional surface, may be reflective or may provide some wavelength or polarization dependent functionality.

Figure 5B:
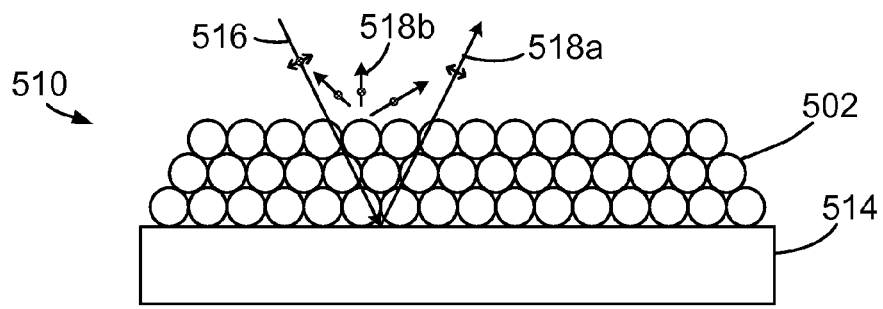

In the optical device 510 schematically illustrated in FIG. 5B, the fibers 502 are arranged on a substrate 514 that is reflective. In this embodiment, unpolarized light 516 that is incident on the device 500 is split into two polarized components. One component 518a is specularly transmitted by the fibers 502 and is reflected by the substrate 514. Where the substrate 514 is specularly reflective, the light 518a is specularly reflected. The other polarization component 518b is diffusely reflected by the fibers 502. In some embodiments, some of the light component 518b may also be diffusely transmitted by the fibers 502, and then reflected by the reflecting substrate 514.

Figure 5C:
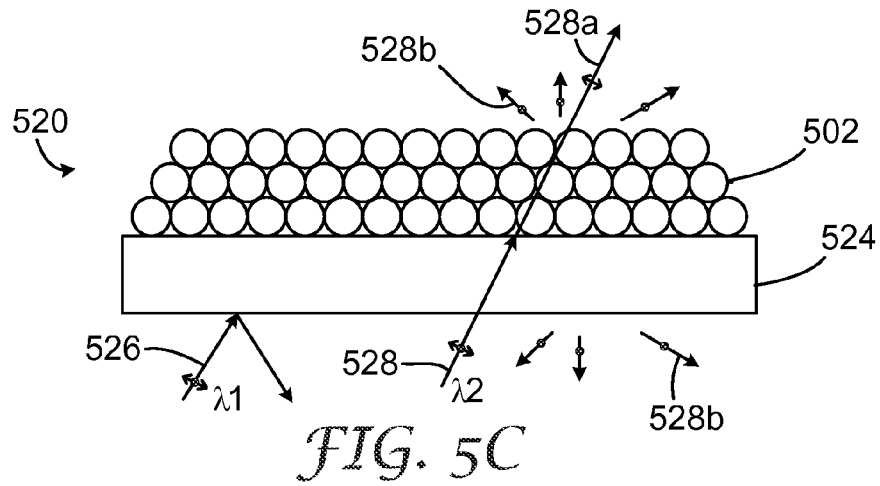

An embodiment of a device 520 having a substrate 524 with a wavelength dependent characteristic is schematically illustrated in FIG. 5C. In this embodiment, the substrate 524 is reflective for light at a first wavelength, $\lambda 1$, and is transmissive for light at a second wavelength, $\lambda 2$. For example, the substrate 524 may be formed of a multilayer mirror that has a reflection cut-off between $\lambda 1$ and $\lambda 2$. Thus, when light 526 at the first wavelength is incident on the substrate 524, the light 526 is reflected. When light 528 at the second wavelength is incident at the substrate 524, the light 528 is transmitted to the fibers 502. In the illustrated embodiment, the light 528 is split into two polarization components, one component 528a being transmitted through the fibers 502 and the other component 528b being diffusely reflected and diffusely transmitted by the fibers 502.

Figure 5D:
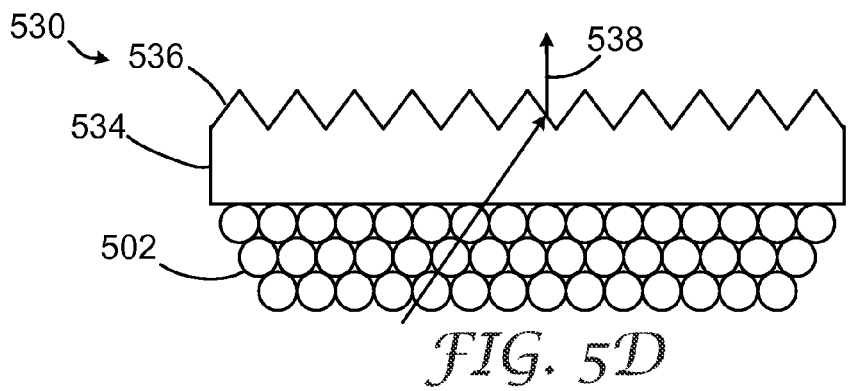

An embodiment of a device 530 in which the substrate 534 has an optically functioning surface is schematically illustrated in FIG. 5D. In this embodiment, the substrate 534 has a brightness enhancing surface 536. Thus, light 538 that is transmitted through the fibers 502 to the substrate 534 may be redirected by the surface 536 on passing out of the substrate 534.

Spiral wound fibers may be formed using various methods, some of which are now described. This is not intended to be an exhaustive list, merely illustrative.

Figure 6:
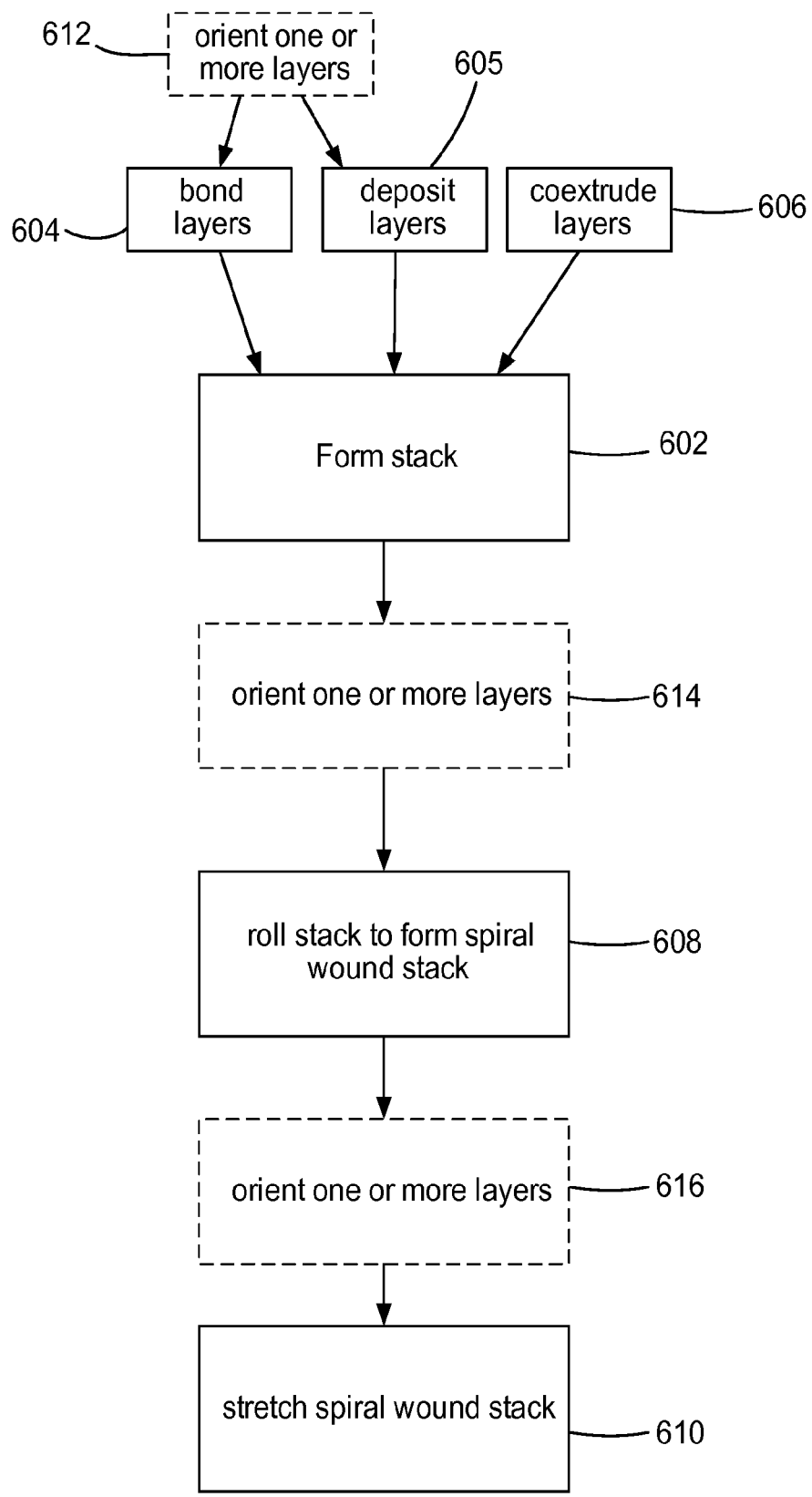
FIG. 6 presents a block diagram illustrating an approach to manufacturing a spiral wound fiber by rolling, according to principles of the present invention.

The first method is based around rolling a stack of polymer layers to form a spiral wound stack, as was discussed above with respect to FIGS. 2A and 2B, and is summarized in the block diagram presented in FIG. 6. Two or more polymer layers are provided and formed into a stack, step 602. Various methods may be used to form the stack containing the two or more layers. For example, the layers may be supplied as individual layers which are bonded together, step 604, for example through the use of an adhesive, lamination, heat and/or pressure, or some other suitable method. In another approach, one or more layers may be deposited on one or more free standing layers, step 605. In another approach, step 606, the layers may be coextruded.

Once the stack is formed, the stack is rolled to form a spiral wound stack, step 608. The stack may be rolled around a core or may be rolled without a core, as described earlier. The spiral wound stack may optionally be stretched, step 610, to reduce the diameter of the spiral wound stack to a desired value.

The polymer layer, or layers, that end up being nonisotropic may optionally be oriented at various stages throughout the fabrication process, illustrated in the block diagram in dashed boxes. For example, one orientation step, step 612, may take place before the individual polymer layers are bonded together. Orientation, step 614, may also take place after the stack has been formed, but before the stack is rolled, or may take place after rolling, step 616. Some degree of orientation may also result from an extrusion process, step 606. Orientation may be performed at any one of these stages, or at multiple stages throughout the manufacturing process.

As mentioned above, orientation is often performed by stretching the polymer layer. The stretching may be performed along the length of the layer being stretched, across its width, or both, and is often performed as a continuous process. Accordingly, one layer may be oriented in one direction prior to bonding and then oriented in another direction either before or after bonding or rolling, to control the birefringence in the radial and axial directions of the final fiber product.

The degree of orientation also depends on the temperature of the polymer. Accordingly, it is possible that a stretching step 610 that follows rolling does not result in further orientation of the polymer material in the fiber but only results in a lengthening of the fiber, with a concomitant reduction of the fiber diameter.

It is important during this manufacturing process that the fiber ultimately ends up with layers having a desired thickness appropriate to the design operating wavelength. Therefore, the thicknesses of the various layers before orientation and stretching are advantageously appropriate to produce the desired final layer thickness following stretching.

In some approaches, a multilayer stack may be rolled around a relatively large core of a pure material. The core may be formed of one of the materials in the multilayer stack or may be a third material. Thus, the multilayer stack rolled on the core creates a "boule"-like starting material. The layers in this "boule" may optionally be consolidated or bonded. The "boule" may be drawn down into fibers, with due attention given to controlling various relevant parameters such as melting temperatures, viscosities, surface tensions and the like. During this process, the resulting layer thicknesses of the fiber produced will be reduced significantly from that of the starting "boule". Diameter and process instabilities may be lessened due to the fact that the final fiber is relatively larger compared to the optically functional layers, potentially yielding more uniform fiber properties.

Another approach to forming a stack is to deposit one or more layers on an initial layer, step 605, for example through a liquid or vapor deposition process to form the initial stack. This approach potentially enables higher material purity. This strategy could be extended to initial multilayer stacks having three or more layers, which are then rolled up to produce a rolled stack. The outer layers of the initial film may be selectively chosen to promote bonding after the rolling-up process.

This approach may also be used to increase the number of different materials in the structure. For example, an isotropic material may be deposited on an initially oriented/birefringent polymer film, forming a two-layer free-standing film, which is then rolled up into a spiral wound stack. This process may enable a broader range of materials to be used in an optically functional multilayer birefringent structure, since the second deposited material would not necessarily need to be stretched and oriented together with the first material, while the final structure could still include birefringent functionality. This relaxes the material property requirements, present in some other approaches for forming birefringent polymer fibers, that the material combinations must be co-deformable in a certain temperature range. The second material may optionally be organic or inorganic. A post-rolling orientation step may also employed if the material properties are suitable.

The approach of depositing one or more of the materials may enable further novel design flexibility, such as incorporating electrically conducting, anti-static, electromagnetic shielding, semi-conducting, light-emitting, or light-detecting materials into the layered stack. Examples of inorganic or functional materials that may be incorporated into the stack include indium tin oxide, zinc oxide, or other metal oxides; semiconductors such as silicon, germanium, gallium arsenide, gallium nitride, indium phosphide, aluminum-gallium-arsenide, or doped or modified forms of these; semiconducting glasses such as chalcogenides; ceramics such as $BaTiO_3$ and $LiNbO_3$; metals such as silver, tin, aluminum, copper, gold, etc.; insulating glasses and ceramics such as silicon oxide, halide glasses, phosphate glasses or fluoride glasses; conducting or light-emitting polymers or small-molecule organics such as polyaniline, polyethylenedioxythiophene (PDOT), polyphenylenevinylene (PPV), aluminum tris(8-hydroxyquinoline) ($Alq_3$), and the like; and carbon-nanotube containing matrix materials.

In another approach a multilayer stack may be extruded, step 606, and rolled, while still molten, onto a spindle or other carrying device to create a fiber-like geometry. This rolling step may be combined with further post-orientation, if desired, as described in some of the above strategies. In a variation of this approach, a multilayer stack may be extruded and wrapped around a molten polymer core that is continuously injected. This approach may also be combined with further post-orientation to create a spiral wound fiber structure.

The spiral fiber can then be passed through a subsequent coating or die-extrusion step to form an outer protective layer on the fiber, or several layers of the same material can be spiral-wound on the outside to form a homogenous outer protective layer.

Figure 7:
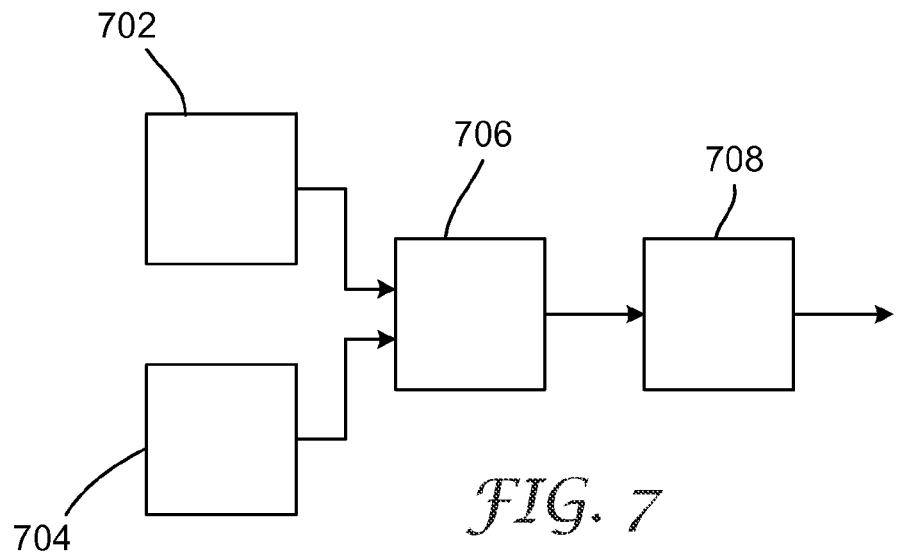
FIG. 7 schematically illustrates another approach to manufacturing a spiral wound fiber, by extrusion, according to principles of the present invention.

Another approach to forming a spiral wound fiber is to extrude a spiral wound fiber directly. This approach is schematically illustrated in FIG. 7. At least two different molten materials 702, 704 are fed to an extrusion die 706. The two materials are led through channels within the die and extruded through appropriately shaped coiled orifices to form a spiral wound structure. This die would not have to split the input polymer streams in forming a single fiber, as happens in then extrusion die used for making standard CML fibers, where the initial stream is split many times. In this case, each polymer material follows a single "stream" that winds into a spiraling layer within the die itself. A single die may optionally form one spiral wound fiber or many such fibers, with fewer "streams" per fiber than CML designs. Depending on extruder or die design, this single die approach may yield advantages in uniformity, flow control, pressure profiles, or process tolerance.

The extrusion die may optionally include a larger single-material core, and/or a cover layer. As has been described above, the core material and cover material may be the same as the material used in one of the spiral wound layers, or may be of a different material.

After the spiral wound material has been extruded, it may be stretched in a stretcher 708. This is typically a longitudinal stretch, along the axis of the fiber.

Figure 8:
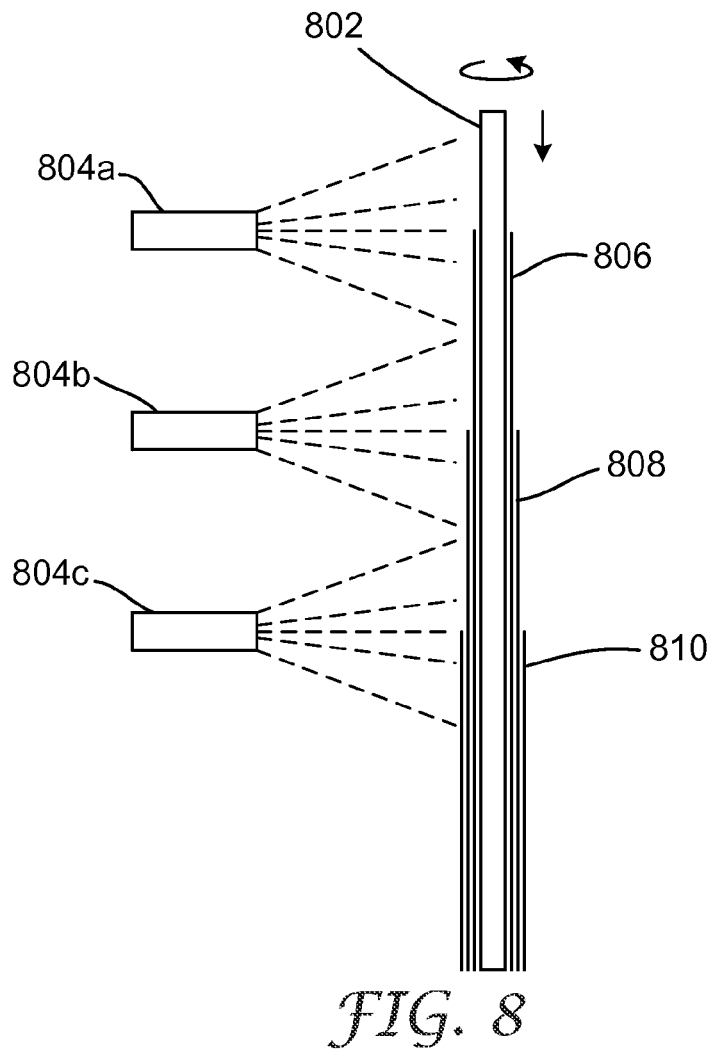
FIG. 8 schematically illustrates another approach to manufacturing a spiral wound fiber, by spiral coating, according to principles of the present invention.

Another approach to forming a spiral wound fiber is schematically illustrated in FIG. 8. In this approach, a core 802 is fed past a number of coating stations 804a, 804b, 804c etc. The core is both rotated about its longitudinal axis and translated along the axis. Material from a first coating station 804a is deposited on the core 802, to produce a first layer 806 on the core. The coated core passes to the next coating station 804b where another layer 808 is deposited on the core. This continues at the third coating station 804c, where another material is coated on the core 802. The material of the third coating station 804c may be the same material as that deposited by the first coating station 804a. Additional coating stations may be provided for additional layers.

The coating stations 804a, 804b, 804c etc. may spray the material on the core. In other approaches, coatings can be applied by evaporative coating in a vacuum chamber. Other types of vapor coating include all types of chemical or physical vapor deposition, including sputtering. Coatings can be applied by running the fiber through a bath of liquid material (e.g. dip coating) and drawing in and out of the bath. Optionally, the fiber can then be drawn through a die (a small hole) to further control the coating thickness. The material is then hardened by cooling or polymerization. By careful control of the spraying rate, translation rate and rotation rate, a spiral wound structure can be formed on the core 802.

The spiral wound structure may subsequently be stretched to orient one or more of the deposited materials.

Figure 9:
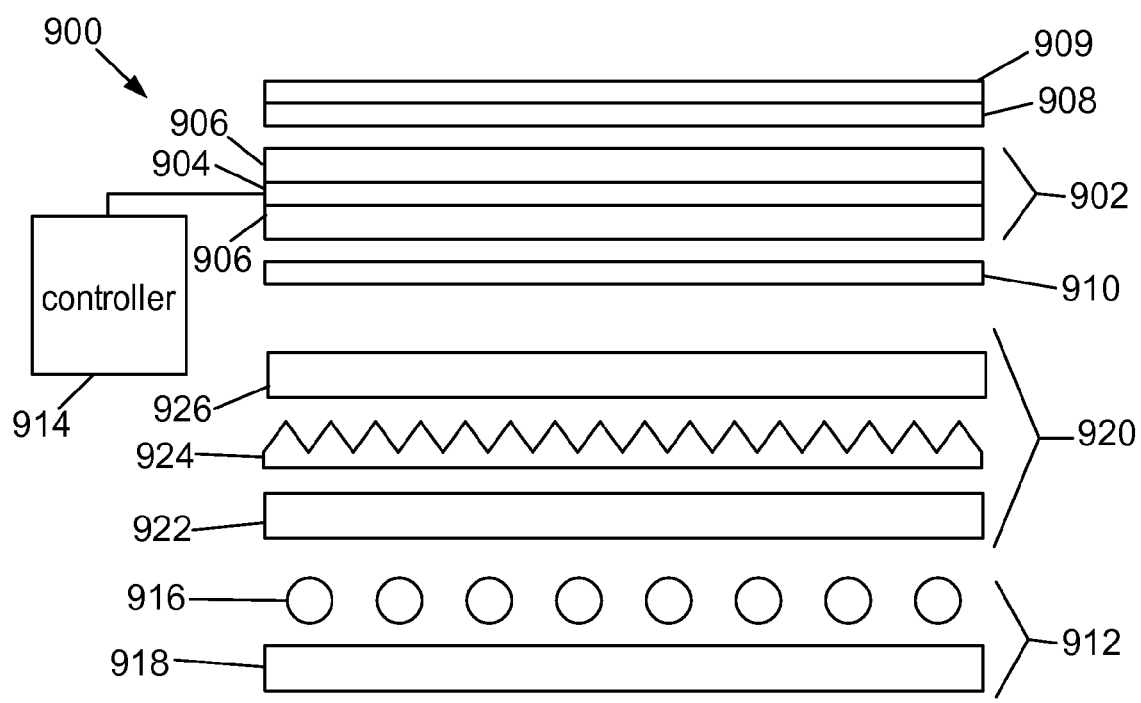
FIG. 9 schematically illustrates an embodiment of a display system that includes spiral wound fibers according to principles of the present invention.

An exemplary embodiment of a display system 900 that may incorporate a spiral wound fiber of the type discussed above is schematically illustrated in FIG. 9. Such a display system 900 may be used, for example, in an LCD monitor or LCD-TV. The display system 900 is based on the use of a liquid crystal (LC) panel 902, which typically comprises a layer of liquid crystal 904 disposed between panel plates 906. The plates 906 are often formed of glass, and may include electrode structures and alignment layers on their inner surfaces for controlling the orientation of the liquid crystals in the LC layer 904. The electrode structures are commonly arranged so as to define LC panel pixels, areas of the LC layer where the orientation of the liquid crystals can be controlled independently of adjacent areas. A color filter may also be included with one or more of the plates 906 for imposing color on the image displayed.

An upper absorbing polarizer 908 is positioned above the LC layer 904 and a lower absorbing polarizer 910 is positioned below the LC layer 904. In the illustrated embodiment, the upper and lower absorbing polarizers 908, 910 are located outside the LC panel 902. The absorbing polarizers 908, 910 and the LC panel 902 in combination control the transmission of light from the backlight 912 through the display 900 to the viewer. Selective activation of different pixels of the LC layer 904, for example by a controller 914, results in the light passing out of the display at certain desired locations, thus forming an image seen by the viewer. The controller may include, for example, a computer or a television controller that receives and displays television images. One or more optional layers 909 may be provided over the upper absorbing polarizer 908, for example to provide mechanical and/or environmental protection to the display surface. In one exemplary embodiment, the layer 909 may include a hardcoat over the upper absorbing polarizer 908.

It will be appreciated that some types of LC displays may operate in a manner different from that described above. For example, the absorbing polarizers may be aligned parallel and the LC panel may rotate the polarization of the light when in an unactivated state. In addition, the display device may be configured in many different ways. The backlight described below is believed to be suitable for use with many different configurations of display devices and is not limited to those configurations described herein.

The system 900 also includes a backlight 912. The backlight 912, which illuminates the display panel 902 from behind, may include a number of light sources 916. In the illustrated embodiment, the light sources 916 are positioned behind the display panel 902. In other embodiments, the light sources 916 may be positioned elsewhere. For example, in some embodiments, the light sources 916 may be positioned to the side, with a light guide positioned behind the display panel 902. The light guide is used to spread the light across the display panel 902, and to direct the light to the panel 902. Any suitable type of light source may be used, for example, a cold cathode fluorescent lamp, a flat fluorescent lamp, light emitting diodes, filament or arc lamps, lasers, flat fluorescent panels or external fluorescent lamps. This list of light sources is not intended to be limiting or exhaustive, but only exemplary.

A reflector 918 may be used for reflecting light propagating in a direction away from the LC panel 902. Such light may arise within the light sources 916 or may be reflected towards the reflector 918 from some other element in the display system 900, for example as is explained below. The reflector 918 may be a specular reflector or may be a diffuse reflector.

An arrangement 920 of light management layers may be positioned between the backlight 912 and the LC panel 902. The light management layers affect the light propagating from backlight 912 so as to improve the operation of the system 900.

For example, the arrangement 920 of light management layers may include a diffuser layer 922. The diffuser layer 922 is typically used to diffuse the light received from the light sources 916, which results in an increase in the uniformity of the illumination light incident on the LC panel 902. Consequently, the image is perceived by the viewer as being more uniformly bright than it would be without the diffuser layer 922. The diffuser layer 922 may include bulk diffusing particles distributed throughout the layer, or may include one or more surface diffusing structures, or a combination thereof.

The arrangement 920 of light management layers may also include one or more brightness enhancing layers 924. A brightness enhancing layer is one that includes a surface structure that redirects off-axis light in a direction closer to the axis of the display. This increases the amount of light propagating on-axis through the LC layer 904, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

The brightness enhancing layer 924 may be positioned anywhere within the stack of light management layers 920, although it will be appreciated that, for certain configurations of light management layers, certain positions within the stack may provide more desirable system performance than other positions.

The arrangement 920 of light management layers may also include a reflecting polarizer 926. In certain embodiments, the light sources 916 produce unpolarized light but the lower absorbing polarizer 910 only transmits a single polarization state, and so about half of the light generated by the light sources 916 is not transmitted through to the LC layer 904. The reflecting polarizer 926, however, may be used to reflect the light that would otherwise be absorbed in the lower absorbing polarizer 910, and so this light may be recycled by reflection between the reflecting polarizer 926 and the reflector 918. At least some of the light reflected by the reflecting polarizer 926 may become depolarized and subsequently returned to the reflecting polarizer 926 in a polarization state that is transmitted through the lower absorbing polarizer 910. In this manner, the reflecting polarizer 926 may be used to increase the fraction of light emitted by the light sources 916 that reaches the LC layer 904, and so the image produced by the display system 900 is brighter. The reflecting polarizer 926 may include an optical element that incorporates one or more spiral wound fibers.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A polymer fiber, comprising:
a first material layer and a second material layer spiral wound together, the first material layer being formed of a birefringent material having a first ordinary refractive index, $n_{1a}$, and a first extraordinary refractive index, $n_{1b}$, the second material layer having at least a first refractive index different from one of the first ordinary refractive index and the first extraordinary refractive index so as to form a birefringent interface with the first material layer, at least one of the first and second material layers being polymeric.

2. A fiber as recited in claim 1, wherein both of the first and second material layers are polymeric.

3. A fiber as recited in claim 1, wherein the at least one refractive index is substantially equal to the other of the first ordinary refractive index and the first extraordinary refractive index.

4. A fiber as recited in claim 1, wherein the first material layer has a first average refractive index, $n^*_1$, the second material layer has a second average refractive index, $n^*_2$, and the absolute value of $(n^*_1 - n^*_2)$ is less than the absolute value of $(n_{1a} - n_{1b})$.

5. A fiber as recited in claim 1, wherein the second material layer is substantially isotropic.

6. A fiber as recited in claim 1, wherein the second material layer is formed of a birefringent material having a second ordinary refractive index, $n_{2a}$, and a second extraordinary refractive index, $n_{2b}$.

7. A fiber as recited in claim 6, wherein the one of $n_{2a}$ and $n_{2b}$ has a value substantially the same as one of $n_{1a}$ and $n_{1b}$.

8. A fiber as recited in claim 1, further comprising a core, the first and second material layers being spiral wound around the core.

9. A fiber as recited in claim 8, wherein the core is a polymer core.

10. A fiber as recited in claim 8, wherein the core is an inorganic fiber core.

11. A fiber as recited in claim 1, wherein the thicknesses of the first and second material layers are selected to be quarter-wave layers for a wavelength in the range 400 nm–700 nm and the fiber is highly reflective for at least some wavelengths in the range 400 nm–700 nm.

12. A fiber as recited in claim 1, wherein the thicknesses of the first and second material layers are selected to be quarter-wave layers for a wavelength in the range 700 nm–2000 nm and the fiber is highly reflective for at least some wavelengths in the range 700 nm–2000 nm.

13. A fiber as recited in claim 1, further comprising a cover layer covering the first and second spiral wound layers.

14. A fiber as recited in claim 1, wherein the fiber forms part of a fiber mat.

15. A fiber as recited in claim 1, wherein the fiber forms part of a fused fiber body.

16. A fiber as recited in claim 1, wherein the fiber is woven in a fiber fabric.

* * * * *

UNITED STATES PATENT AND TRADEMARK OFFICE
CERTIFICATE OF CORRECTION

PATENT NO. : 7,327,923 B2 Page 1 of 1
APPLICATION NO. : 11/278348
DATED : February 5, 2008
INVENTOR(S) : Shandon D. Hart It is certified that error appears in the above-identified patent and that said Letters Patent is hereby corrected as shown below:

Title Page
Item [56], References Cited, OTHER PUBLICATIONS, page 2, After "having" delete "," and insert -- Attorney Docket No. 61102US002, --, therefor.
Item [56], References Cited, OTHER PUBLICATIONS, page 2, After "having" delete "," and insert -- Attorney Docket No. 62020US002, --, therefor.
Item [56], References Cited, OTHER PUBLICATIONS, page 2, After "having" delete "," and insert -- Attorney Docket No. 62018US002, --, therefor.
Item [56], References Cited, OTHER PUBLICATIONS, page 2, After "having" delete "," and insert -- Attorney Docket No. 62021US002, --, therefor.
Item [56], References Cited, OTHER PUBLICATIONS, page 2, After "having" delete "," and insert -- Attorney Docket No. 61068US002, --, therefor.

Column 6
Line 10, Delete "napthalates" and insert -- naphthalates --, therefor.

Signed and Sealed this

Twenty-sixth Day of August, 2008

JON W. DUDAS
*Director of the United States Patent and Trademark Office*